United States Patent [19]

Collen

[11] 4,424,471
[45] Jan. 3, 1984

[54] ELECTRICAL MOTOR

[75] Inventor: John W. Collen, Billericay, England

[73] Assignee: Ford Motor Company, Dearborn, Mich.

[21] Appl. No.: 353,754

[22] Filed: Mar. 1, 1982

[30] Foreign Application Priority Data

Mar. 10, 1981 [GB] United Kingdom ............ 8102562

[51] Int. Cl.$^3$ ............................................ H02K 29/02
[52] U.S. Cl. ................................. 318/138; 318/254
[58] Field of Search ................... 318/254, 138, 439

[56] References Cited

U.S. PATENT DOCUMENTS 3,264,339  8/1966  Sander .............................. 318/254
3,402,333  9/1968  Hayner et al. .................... 318/254
3,662,237  5/1972  Favre ............................... 318/254
4,286,198  8/1981  de Valroger ...................... 318/254

Primary Examiner—David Smith, Jr.
Attorney, Agent, or Firm—Peter Abolins; Robert D. Sanborn

[57] ABSTRACT

An electrical motor comprises a rotor (2) carrying a plurality of permanent magnetic poles (6), a stator (4) carrying at least two main windings (22,23) which, when activated interact with the magnetic fields generated by the poles (6) to drive the rotor (2), search windings (25,26) on the stator associated with each of the main windings and arranged to interact with the magnetic field generated by the poles, and switches (T$_1$, T$_2$, R$_4$, C) for each main winding (22,23) operable by the search windings (25,26) to activate the main windings for different periods so that the rotor always starts to rotate in the same direction.

1 Claim, 5 Drawing Figures

ELECTRICAL MOTOR

DESCRIPTION

This invention relates to electrical motors.

Conventional direct-current motors include a rotor, carrying a plurality of magnetic poles, and a stator, carrying at least two main windings which, when activated interact with the magnetic field produced by the magnetic poles to drive the rotor relative to the stator. Switching means in the form of a commutator and brushes is required to change the state of activation of the main windings in accordance with the rotational position of the rotor so that the rotor continues to rotate in one direction.

It has previously been proposed to replace the conventional commutator and brushes with electronic switching means such as a Hall generator (see, for example, British patent specification No.: 1,269,4343). This avoids the manufacturing problems associated with commutators and brushes. However, Hall generators are relatively expensive.

One possible way of achieving electronic switching without the use of a Hall generator would be to provide search windings on the rotor and to use the current induced therein by their interaction with the magnetic field produced by the magnetic poles to effect the switching of the main coils. However, such a rotor would be equally likely to commence rotation in one direction as the other when first switched on.

According to the present invention there is provided an electrical motor comprising a rotor carrying a plurality of permanent magnetic poles, a stator carrying at least two main windings which, when activated, interact with the magnetic field generated by the said poles to drive the rotor relative to the stator, and electronic switching means for activating the main windings in sequence in accordance with the rotational position of the rotor characterised in that the electronic switching means comprises search windings on the stator each associated with a respective one of the main windings and arranged to interact with the magnetic field generated by the said poles, and switches for each main winding operable by the search winding associated therewith to activate the main windings for different periods.

Since the main windings are energised for different periods, the rotational force produced by the main windings is different. It is therefore possible, by matching the energisation periods of the main windings to the inertia of the rotor, to ensure that the rotor always commences rotation in the same direction.

The switches preferably comprise switch circuits incorporating transistors. For example, each switch may comprise a power transistor for conducting current through the main winding, and a drive transistor for controlling the conductive state of the transistor.

The differences in activation of the main windings is conveniently achieved by connecting the search windings into a switch circuit having a different time constant.

To assist in a rapid start up of the motor each switch is preferably operable in response to current induced in the search winding by the main winding. Additionally, the main winding preferably occupies unequal parts of the circumferential length of the stator.

A preferred embodiment of the invention will now be described, by way of example only, with reference to the accompanying drawings, in which.

Figure 1:
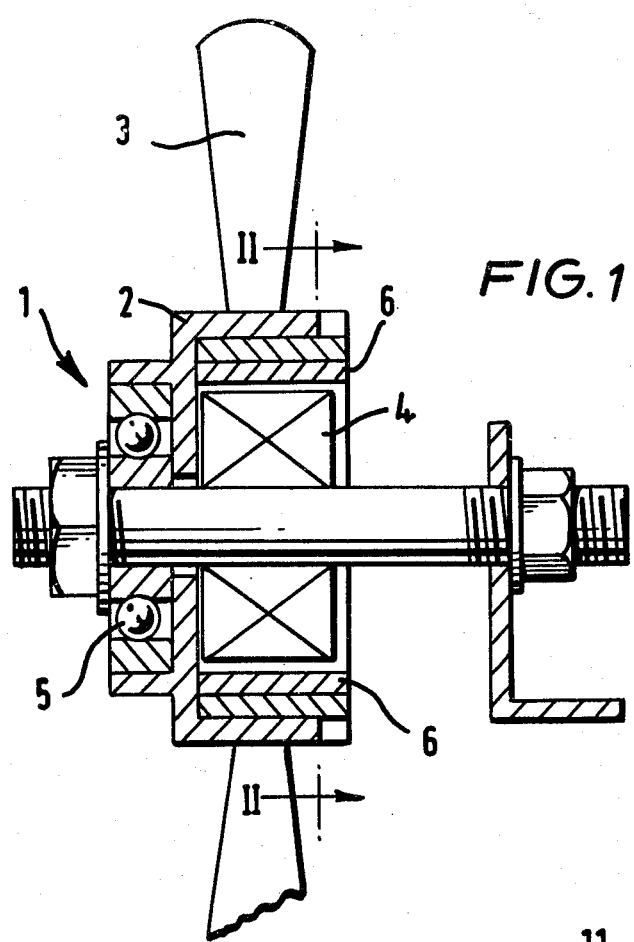
FIG. 1 is an axial cross-section through a fan incorporating an electric motor in accordance with the invention.
Figure 2:
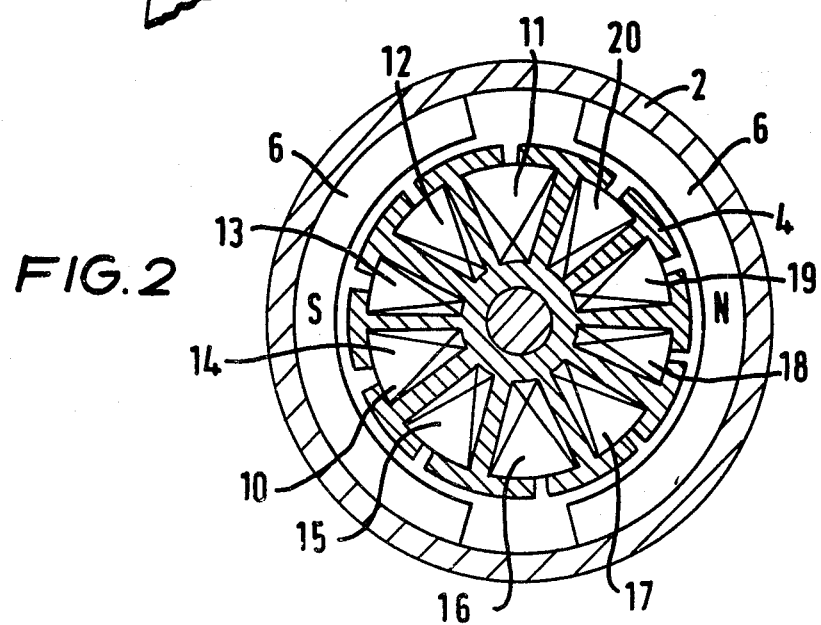
FIG. 2 is a radial cross-section through the fan of FIG. 1, taken along the line II—II.

Referring to the drawings, an electric motor, indicated generally at 1, comprises a rotor 2 which carries a set of fan blades 3. The rotor 2 is rotatably mounted on a stator 4 by means of a single bearing race 5. The rotor 2 carries a plurality (in this case two) of permanent magnets 6, 6 disposed circumferentially around the stator 4. One of the magnets 6 has a North pole piece facing the rotor, the other having a South pole piece facing the rotor.

The stator 4 is of conventional laminated construction, with windings 10 located in five pairs of radially opposed slots 11 to 20.

The windings 10 are divided into four groups. A first main winding 22 (FIG. 3) occupies two adjacent pairs of opposite slots 11,12, 16 and 17. A second main winding 23 (FIG. 3) occupies three adjacent pairs of opposite slots 13 to 15 and 18 to 20 at 90° to those occupied by the first main winding 22.

A first search winding 25 (FIG. 3) occupies the same slots as the first main winding 22, and a second search winding 26 occupies the same slots as the second main winding 23.

Figure 3:
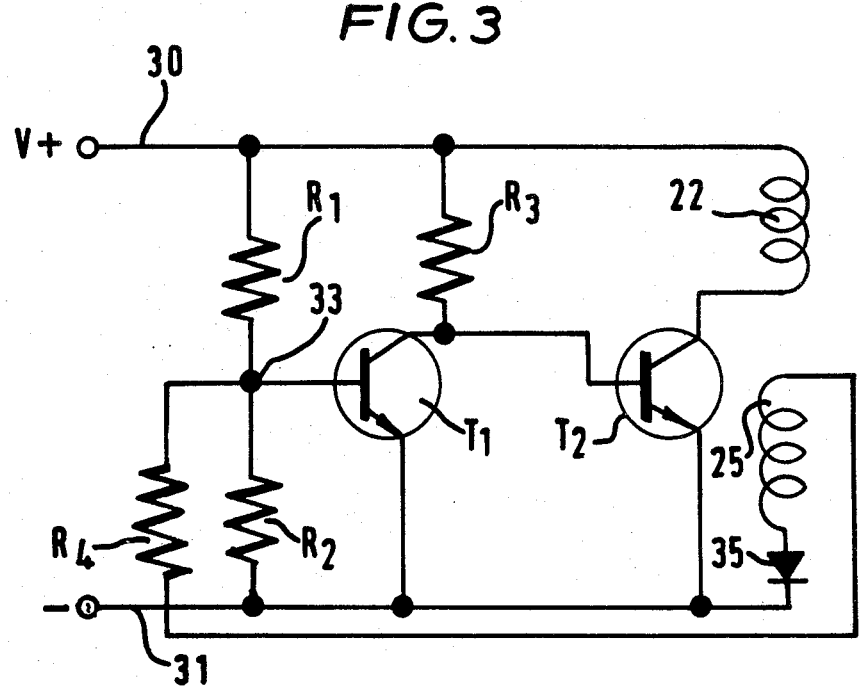
FIG. 3 is a circuit diagram of the rotor incorporated in the fan of FIGS. 1 and 2.
Figure 3:
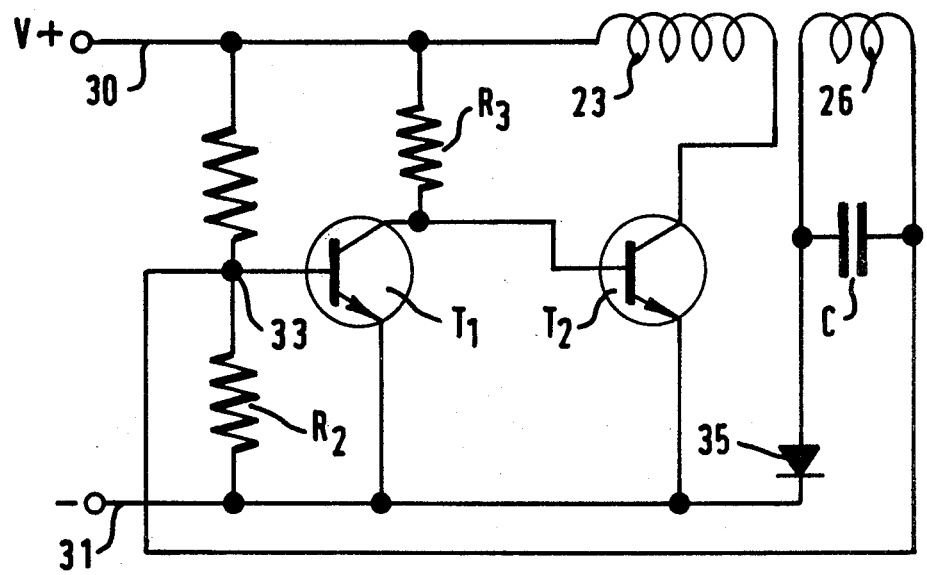

The main windings 22,23 and the search windings 25,26 are electrically interconnected by the circuit illustrated in FIG. 3.

Considering the first main winding 22 and the first search winding 25, as illustrated in the upper part of FIG. 3, a voltage V is supplied to the circuit by a DC voltage source along positive and negative lines 30,31. The voltage across the supply lines 30,31 is divided by first and second resistors $R_1$ and $R_2$. The dividing point 33 between the two resistors $R_1$ and $R_2$ is connected to the base of a drive transistor $T_1$ of the N-P-N type, the collector of which is connected to the positive supply line 30 through a third resistor $R_3$, the emitter of the drive transistor $T_1$ being connected to the negative supply line 31. The junction between the third resistor $R_3$ and the collector of the drive transistor $T_1$ is connected to the base of an N-P-N power transistor $T_2$ the collector of which is connected to one side of the first main winding 22, the other side of the first main winding 22 being connected to the positive supply line 30. The emitter of the power transistor $T_2$ is connected to the negative supply line 31.

One side of the search winding is connected to the negative supply line 31 via a diode 35. The other side of the search winding 25 is connected to the dividing point 33 between the two resistors $R_1$ and $R_2$ via a biasing resistor $R_4$.

The second main winding 23 and the second search winding 26 are connected to the supply lines 30,31 in a manner similar to the first main and search windings 22,25, as illustrated in the lower part of FIG. 3, similar components being identified by the reference numerals. That part of the circuit for the second main and search windings differs from that for the first windings in that the bias resistor $R_4$ is omitted and the second search winding is connected in parallel with a capacitor C.

In operation, when the motor 1 is switched on, the positive voltage at the base of each drive transistor $T_1$ is low, so that the drive transistors do not conduct. The positive voltage applied to the bases of the power transistors $T_2$ are, however, high, so that they are conductive. Current therefore flows through the main windings 22,23. As the current in the main windings increases, the magnetic fields generated by the main windings 22,23 induce currents in the search windings 25,26. This increases the positive voltage at the bases of the drive transistors $T_1$ to a level sufficient to cause the drive transistors to conduct. The potential at the bases of the power transistors $T_2$ therefore reduces so that the power transistors $T_2$ cease conducting. The currents through the main windings 22,23 cease, and the associated magnetic fields collapse. The diodes 35 prevent the resulting reverse currents generated in the search windings 25,26 from being transmitted to the drive transistors $T_1$. The potential at the bases of the drive transistors therefore drop so that the drive transistors $T_1$ also cease conducting. This increases the potential at the bases of the power transistors $T_2$ so that they start to conduct once again. The sequence of events is therefore repeated. The search windings 25,26 and the associated transistors $T_1,T_2$ therefore act as switch circuits for the main windings 22,23 and cause the magnetic fields produced by the main windings to rise and fall in phase with each other.

The duration of the magnetic fields produced by each main winding will depend upon the period for which the drive transistors $T_1$ are held in a conducting state. This period differs for the two drive transistors $T_1$ because the capacitor C increases the time constant of the circuit incorporating the second search winding 26, whilst the bias resistor R decreases the time constant of the current incorporating the first search winding 25.

Figure 4:
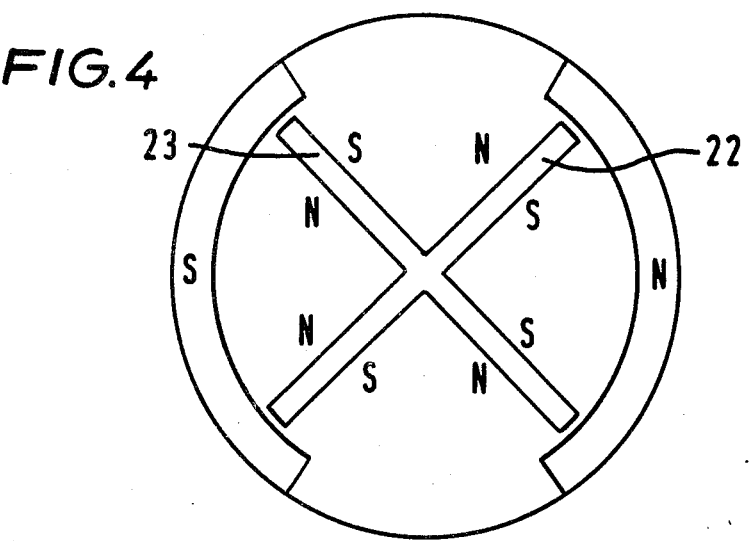
FIGS. 4 and 5 are diagrams indicating the state energisation of the rotor in two different rotational positions.
Figure 5:
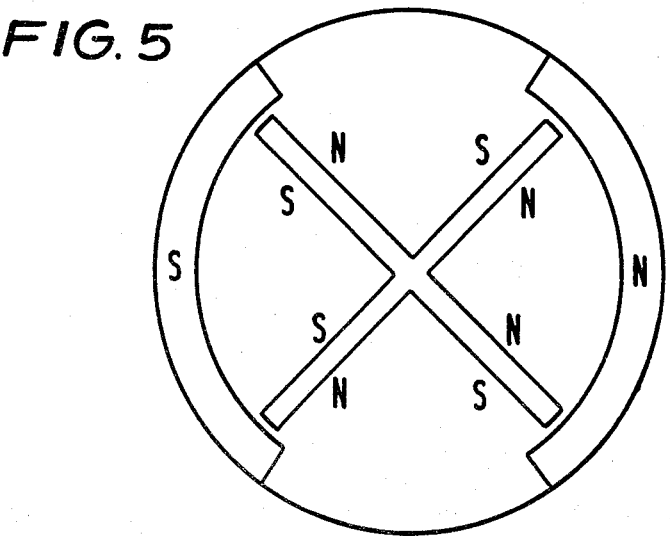

The magnetic fields generated in the main windings 22,23 interact with the permanent magnetic fields of the magnets 6 to rotate the rotor 4. FIGS. 4 and 5 schematically illustrate the motor 1 in two starting positions and the respective polarities of the main windings 22,23. In the positions illustrated, repulsion between the magnetic field produced by the main windings is at a minimum in FIG. 4 and a maximum in FIG. 5. Considering FIG. 4, when the motor is switched on, the rotor is subjected to a slight rotational movement as a result of the disposition of the first main winding 22 over a greater circumferential length of the rotor than the second main winding 23. When the rotor moves slightly clockwise out of the equilibrium position the pulsating magnetic field established by the main windings will apply an anti-clockwise restoring force on the rotor tending to return it to its equilibrium position. The initial movement of the rotor therefore results in an oscillation of the rotor about its equilibrium point. Since each movement of the rotor induces a current in the main windings the field generated by the rotor is strengthened, and the amplitude of the oscillations of the rotor increase until the rotor turns through 180°. When this occurs, the rotor continues to rotate in the same direction.

As the rotor rotates, the search coils operate under the influence of the magnets in the rotor to actuate the main windings 22,23 each time the search coils are swept by the magnets 6 on the rotor so that the rotor accelerates to a maximum operating speed.

If the circuits incorporating the first and second windings were identical, the rotor would be equally likely to commence rotation in either direction. In the present rotor however, the time constants of the switch circuits controlling the main windings 22,23 are different. Hence the restraining forces exerted on the rotor by the second main windings are greater than those exerted by the first main windings. By selecting the time constants of the switch circuits the switching arrangement for the main windings can be matched to the inertia of the rotor to ensure that rotation always commences in the same direction.

The operation of the circuit is similar for the starting position illustrated in FIG. 5. In this starting position, initial movement of the rotor from the unstable equilibrium position shown causes the rotor to move towards the position illustrated in FIG. 4 with a consequent increase in the current in the main windings 22,23. Thereafter the rotor operates in the manner previously described.

Although the embodiment of the invention described above is provided with only two main windings, the invention is equally applicable to motors incorporating three or more main windings. In such a construction, the initial oscillations of the rotor during starting would extend over a correspondingly shorter angular distance, thereby reducing start-up time.

Additionally, the rotor and stator may be constructed as parallel discs so that the length of the motor may be reduced.

I claim:

1. An electrical motor comprising a rotor carrying a plurality of permanent magnetic poles, a generally cylindrical stator with a circumference carrying at least two main windings which, when activated, interact with the magnetic fields generated by the said poles to drive the rotor relative to the stator, and electronic switching means for activating the main windings, in sequence in accordance with the rotational position of the rotor characterized in that the electronic switching means comprises search windings on the stator each associated with a respective one of the main windings and arranged to interact with the magnetic field generated by the said poles, and switches for each main winding operable by the search winding associated therewith to activate the main windings for different periods;

one of said at least two main windings occupying a greater part of the circumferential length of the stator than any other of said at least two main windings so that said at least two main windings provide an unequal force to facilitate rotation of said rotor;

each of said switches including a power transistor for conducting current through the main winding, and a drive transistor for controlling the conductive state of the power transistor and each of said switches being operable in response to current induced in the search winding by the main winding; and said search windings being connected into switch circuits having different time constants, at least one search winding being coupled in series with a bias resistor thereby reducing the time constant for causing switching and at least one search winding being coupled in parallel with a capacitor thereby increasing the time constant for causing switching, so that at least two search windings have different associated time constants to insure rotation of the rotor in a predetermined direction.

* * * * *